United States Patent
Mekis et al.

(10) Patent No.: US 10,345,540 B2
(45) Date of Patent: Jul. 9, 2019

(54) METHOD AND SYSTEM FOR COUPLING A LIGHT SOURCE ASSEMBLY TO AN OPTICAL INTEGRATED CIRCUIT

(71) Applicant: Luxtera, Inc., Carlsbad, CA (US)

(72) Inventors: Attila Mekis, Carlsbad, CA (US); Peng Sun, San Diego, CA (US); Steffen Gloeckner, San Diego, CA (US); Michael Mack, San Diego, CA (US); Steven Hovey, Goleta, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

(21) Appl. No.: 15/975,964

(22) Filed: May 10, 2018

(65) Prior Publication Data

US 2018/0259725 A1    Sep. 13, 2018

Related U.S. Application Data

(63) Continuation of application No. 14/606,839, filed on Jan. 27, 2015, now Pat. No. 9,971,107, which is a continuation-in-part of application No. 14/324,544, filed on Jul. 7, 2014, which is a continuation of application No. 13/894,052, filed on May 14, 2013, now Pat. No. 8,772,704, which is a continuation of application No. 13/455,641, filed on Apr. 25, 2012, now Pat. No. 8,440,989, which is a continuation of (Continued)

(51) Int. Cl.
*H04B 10/00* (2013.01)
*G02B 6/42* (2006.01)
*G02B 6/12* (2006.01)

(52) U.S. Cl.
CPC .. *G02B 6/4213* (2013.01); *G02B 2006/12107* (2013.01)

(58) Field of Classification Search
USPC .................................................. 398/156, 164
See application file for complete search history.

(56) References Cited

U.S. PATENT DOCUMENTS

| 4,876,680 A | * | 10/1989 | Misawa | G11B 7/124 |
| | | | | 369/112.14 |
| 4,918,679 A | * | 4/1990 | Opheij | G11B 7/0901 |
| | | | | 369/112.05 |

(Continued)

*Primary Examiner* — Agustin Bello
(74) *Attorney, Agent, or Firm* — McAndrews, Held & Malloy

(57) ABSTRACT

Methods and systems for coupling a light source assembly to an optical integrated circuit are disclosed and may include a system comprising a laser source assembly having a laser, a rotator, and a mirror, where the laser source assembly is coupled to a die including an angled grating coupler and a waveguide. The system may generate an optical signal utilizing the laser, rotate the polarization of the optical signal utilizing the rotator, reflect the rotated optical signal onto the grating coupler on the die, and couple the optical signal to the waveguide, where an angle between a grating coupler axis that is parallel to the waveguide and a plane of incidence of the optical signal reflected to the angled grating coupler is non-zero. The angle between the grating coupler axis and the plane of incidence of the optical signal reflected to the angled grating coupler may be 45 degrees.

21 Claims, 18 Drawing Sheets

Related U.S. Application Data application No. 12/500,465, filed on Jul. 9, 2009, now Pat. No. 8,168,939.

(60) Provisional application No. 61/965,334, filed on Jan. 27, 2014, provisional application No. 61/079,358, filed on Jul. 9, 2008.

(56) References Cited

U.S. PATENT DOCUMENTS

| | | | | |
|---|---|---|---|---|
| 4,999,489 A * | 3/1991 | Huggins | ............ | G01D 5/34776 250/226 |
| 5,081,615 A * | 1/1992 | Sunagawa | ................ | G02B 6/34 369/112.27 |
| 5,082,339 A * | 1/1992 | Linnebach | ............... | G02B 5/32 359/15 |
| 5,208,800 A * | 5/1993 | Isobe | ..................... | G02B 6/126 369/112.27 |
| 5,351,262 A * | 9/1994 | Poguntke | ........... | G02B 6/12007 372/102 |
| 5,621,715 A * | 4/1997 | Ohyama | ................ | G02B 6/124 369/103 |
| 6,553,162 B1 * | 4/2003 | Okayama | ........... | G02B 6/12007 359/634 |
| 6,678,429 B2 * | 1/2004 | Mossberg | ................ | G02B 5/32 359/565 |
| 6,934,444 B2 * | 8/2005 | Ghiron | ..................... | G02B 6/34 385/36 |
| 6,969,204 B2 * | 11/2005 | Kilian | ................. | G02B 6/4214 385/88 |
| 7,286,732 B2 * | 10/2007 | Greiner | ................. | G02B 5/203 359/10 |
| 7,720,334 B1 * | 5/2010 | Mossberg | ............. | G02B 6/124 385/129 |
| 7,729,579 B1 * | 6/2010 | Greiner | ................. | G02B 6/124 385/14 |
| RE41,570 E * | 8/2010 | Greiner | ................. | G02B 5/203 359/10 |
| 7,773,842 B2 * | 8/2010 | Greiner | ................ | G02B 5/1861 385/37 |
| RE41,954 E * | 11/2010 | Greiner | .............. | G02B 6/12007 385/129 |
| RE42,206 E * | 3/2011 | Mossberg | .......... | G02B 6/12004 372/102 |
| 8,068,709 B2 * | 11/2011 | Iazikov | ................ | G02B 5/1866 359/566 |
| 8,168,939 B2 * | 5/2012 | Mack | .................... | H04B 10/503 250/225 |
| 8,440,989 B2 * | 5/2013 | Mack | .................... | H04B 10/503 250/551 |
| 8,772,704 B2 * | 7/2014 | Mack | .................... | H04B 10/503 250/225 |
| 8,861,906 B2 * | 10/2014 | Pinguet | .................. | G02B 6/124 385/37 |
| 9,109,948 B2 * | 8/2015 | Pinguet | .................. | G02B 6/124 |
| 9,176,282 B2 * | 11/2015 | Pottier | ............... | G02B 27/4244 |
| 9,213,155 B2 * | 12/2015 | Miao | ...................... | G02F 1/093 |
| 2010/0006784 A1 * | 1/2010 | Mack | .................... | H04B 10/503 250/551 |
| 2012/0205524 A1 * | 8/2012 | Mack | .................... | H04B 10/503 250/225 |
| 2013/0336664 A1 * | 12/2013 | Mack | .................... | H04B 10/503 398/184 |
| 2014/0233891 A1 * | 8/2014 | Pottier | ............... | G02B 27/4244 385/37 |
| 2015/0070697 A1 * | 3/2015 | Ho | ........................... | G01J 3/20 356/328 |
| 2015/0215046 A1 * | 7/2015 | Mekis | .................. | G02B 6/4213 398/200 |

* cited by examiner

METHOD AND SYSTEM FOR COUPLING A LIGHT SOURCE ASSEMBLY TO AN OPTICAL INTEGRATED CIRCUIT

CROSS-REFERENCE TO RELATED APPLICATIONS/INCORPORATION BY REFERENCE

This application is a continuation of U.S. application Ser. No. 14/606,839 filed on Jan. 27, 2015, which is a continuation-in-part of U.S. application Ser. No. 14/324,544, filed on Jul. 7, 2014, which is a continuation of application Ser. No. 13/894,052 filed on May 14, 2013, now U.S. Pat. No. 8,772,704, which is a continuation of application Ser. No. 13/455,641 filed on Apr. 25, 2012, now U.S. Pat. No. 8,440,989, which is a continuation of application Ser. No. 12/500,465 filed on Jul. 9, 2009, now U.S. Pat. No. 8,168,939, which in turn makes reference to, claims priority to and claims the benefit of U.S. Provisional Patent Application No. 61/079,358 filed on Jul. 9, 2008. Said application Ser. No. 14/606,839 claims priority to and the benefit of U.S. Provisional Application 61/965,334 filed on Jan. 27, 2014, which is hereby incorporated herein by reference in its entirety.

FIELD

Certain embodiments of the disclosure relate to semiconductor processing. More specifically, certain embodiments of the disclosure relate to a method and system for coupling a light source assembly to an optical integrated circuit.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for coupling a light source assembly to an optical integrated circuit, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Certain aspects of the disclosure may be found in a method and system for coupling a light source assembly to an optical integrated circuit. Exemplary aspects of the disclosure may comprise a system comprising a laser source assembly having a laser, a rotator, and a mirror, where the laser source assembly is coupled to a die comprising an angled grating coupler and a waveguide. The system may generate an optical signal utilizing the laser, rotate the polarization of the optical signal utilizing the rotator, reflect the rotated optical signal onto the grating coupler on the die, and couple the optical signal to the waveguide, where an angle between a grating coupler axis that is parallel to the waveguide and a plane of incidence of the optical signal reflected to the angled grating coupler is non-zero. The angle between the grating coupler axis and the plane of incidence of the optical signal reflected to the angled grating coupler may be 45 degrees, for example. The angled grating coupler may comprise grates with tangential planes at the grating coupler axis that are not perpendicular to the grating coupler axis. The angle between the grating coupler axis and the plane of incidence of the optical signal reflected to the angled grating coupler may be configured by the rotator. The die may comprise a silicon die. The rotator may comprise a non-reciprocal rotator. The angled grating coupler may comprise an overlay of two different angled grating couplers that couple signals into the waveguide and a second waveguide on the die. The optical signal reflected to the angled grating coupler may be split into the waveguide and the second waveguide utilizing overlaid grating couplers. The rotator may comprise a reciprocal rotator. The laser may comprise a semiconductor laser.

Figure 1A:
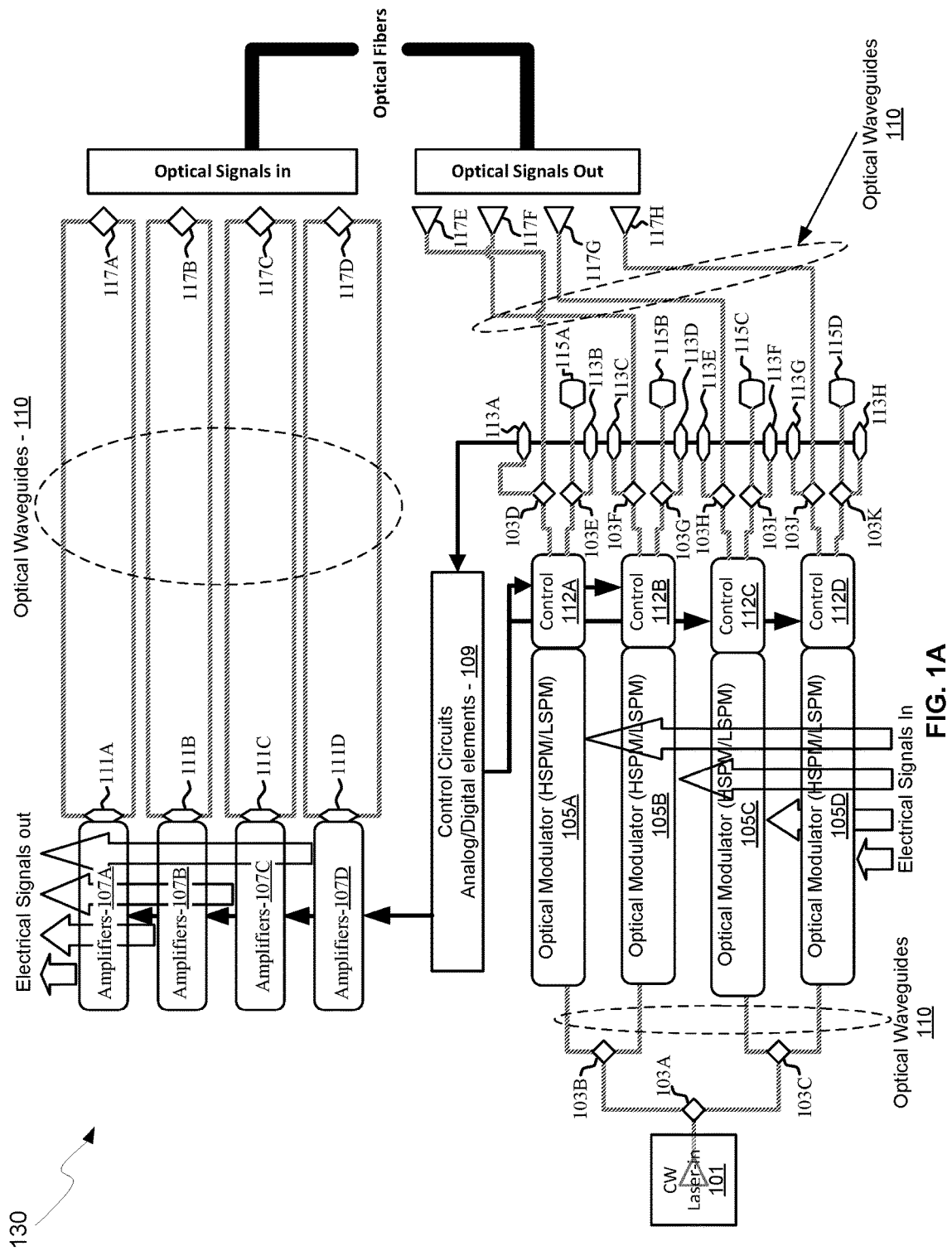
FIG. 1A is a block diagram of a photonically enabled CMOS chip comprising angled grating couplers, in accordance with an example embodiment of the disclosure.

FIG. 1A is a block diagram of a photonically enabled CMOS chip comprising angled grating couplers, in accordance with an example embodiment of the disclosure. Referring to FIG. 1A, there is shown optoelectronic devices on a CMOS chip 130 comprising optical modulators 105A-105D, photodiodes 111A-111D, monitor photodiodes 113A-113H, and optical devices comprising couplers 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

Optical signals are communicated between optical and optoelectronic devices via optical waveguides 110 fabricated in the CMOS chip 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

The outputs of the modulators 105A-105D may be optically coupled via the waveguides 110 to the grating couplers 117E-117H. The couplers 103A-103K may comprise four-port optical couplers, for example, and may be utilized to sample or split the optical signals generated by the optical modulators 105A-105D, with the sampled signals being measured by the monitor photodiodes 113A-113H. The unused branches of the directional couplers 103D-103K may be terminated by optical terminations 115A-115D to avoid back reflections of unwanted signals.

The grating couplers 117A-117H comprise optical gratings that enable coupling of light into and out of the CMOS chip 130. The grating couplers 117A-117D may be utilized to couple light received from optical fibers into the CMOS chip 130, and the grating couplers 117E-117H may be utilized to couple light from the CMOS chip 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the CMOS chip 130 to optimize coupling efficiency. In an example embodiment, the optical fibers may comprise single-mode fiber (SMF) and/or polarization-maintaining fiber (PMF).

In another exemplary embodiment, optical signals may be communicated directly into the surface of the CMOS chip 130 without optical fibers by directing a light source on an optical coupling device in the chip, such as the light source interface 135 and/or the optical fiber interface 139. This may be accomplished with directed laser sources and/or optical sources on another chip flip-chip bonded to the CMOS chip 130.

The photodiodes 111A-111D may convert optical signals received from the grating couplers 117A-117D into electrical signals that are communicated to the amplifiers 107A-107D for processing. In another embodiment of the disclosure, the photodiodes 111A-111D may comprise high-speed heterojunction phototransistors, for example, and may comprise germanium (Ge) in the collector and base regions for absorption in the 1.3-1.6 μm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the CMOS chip 130. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the CMOS chip 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the CMOS chip 130.

An integrated transceiver may comprise at least three optical interfaces, including a transmitter input port to interface to the CW light source, labeled as CW Laser In 101; a transmitter output port to interface to the fiber carrying the optical signal, labeled Optical Signals Out; and a receiver input port to interface to the fiber carrying the optical signal, labeled Optical Signals In.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths.

It is often advantageous to have an external continuous-wave (CW) light source, because this architecture allows heat sinking and temperature control of the source separately from the transceiver chip 130. An external light source may also be connected to the transceiver chip 130 via a fiber interface. The light source can be integrated onto the integrated optics chip in a hybrid fashion where a separately packaged light source assembly is attached to the integrated optics chip.

The light source package may contain a lensing element to improve coupling efficiency to the integrated optics chip, as well as an isolator to minimize reflections back to the laser chip. The isolator typically comprises a non-reciprocal polarization rotator followed by a polarizer element. This isolator may be positioned between the coupling element that couples the optical signal to an optical waveguide in the integrated optics chip, as shown schematically in FIG. 2A. In an example scenario, angled grating couplers may be utilized in the transceiver chip 130, which may reduce the rotator requirements of the light source assembly.

Figure 1B:
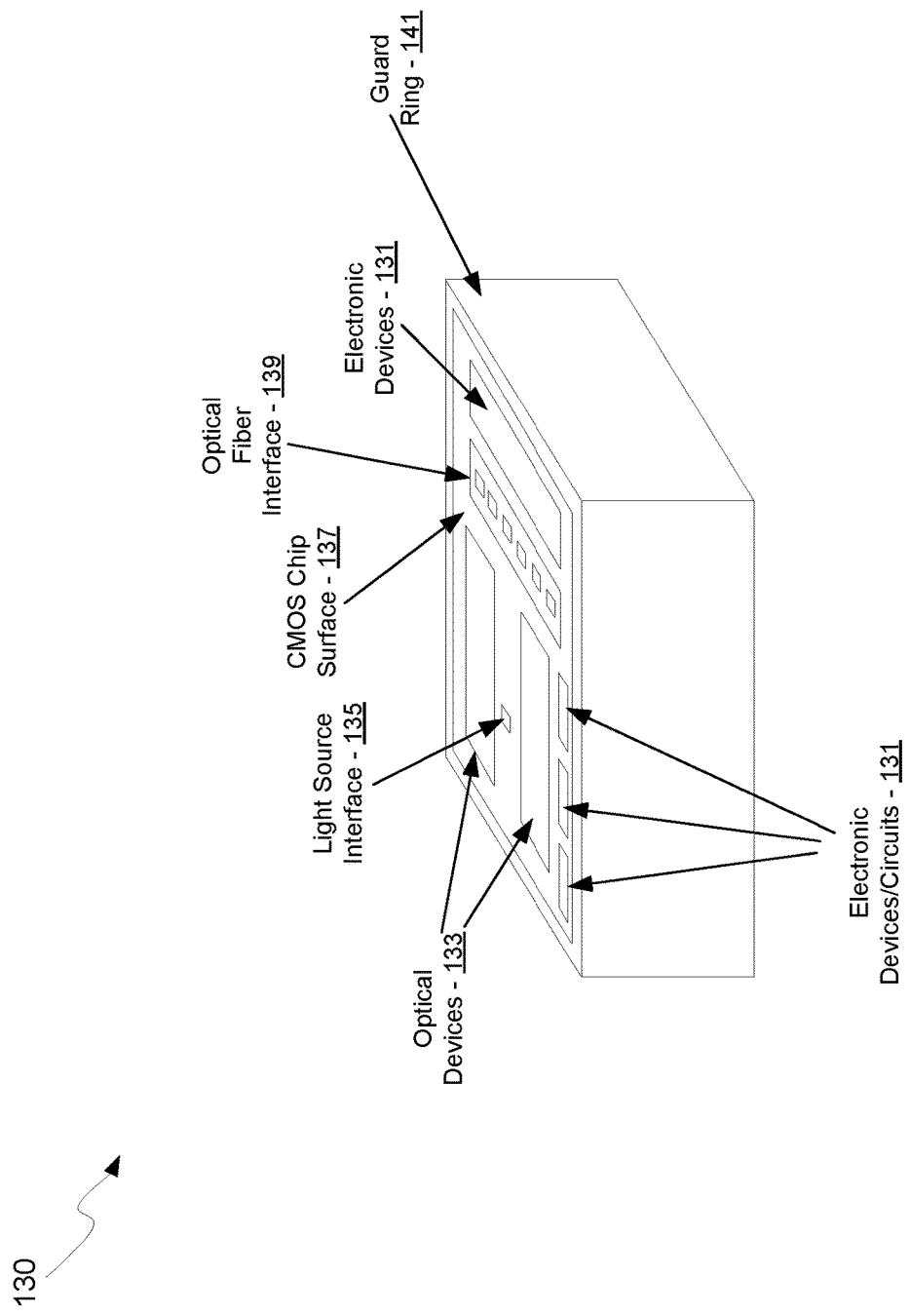
FIG. 1B is a diagram illustrating a CMOS chip, in accordance with an example embodiment of the disclosure.

FIG. 1B is a diagram illustrating an exemplary CMOS chip, in accordance with an exemplary embodiment of the disclosure. Referring to FIG. 1B, there is shown the CMOS chip 130 comprising electronic devices/circuits 131, optical and optoelectronic devices 133, a light source interface 135, CMOS chip front surface 137, an optical fiber interface 139, and CMOS guard ring 141.

The light source interface 135 and the optical fiber interface 139 comprise grating couplers, for example, that enable coupling of light signals via the CMOS chip surface 137, as opposed to the edges of the chip as with conventional edge-emitting devices. Coupling light signals via the CMOS chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103K, optical terminations 115A-115D, grating couplers 117A-117H, optical modulators 105A-105D, high-speed heterojunction photodiodes 111A-111D, and monitor photodiodes 113A-113H.

In an example scenario, the light source interface 135 may comprise angled grating couplers that select polarization near 45° with respect to the plane of incidence and is thus compatible with a light source assembly without a reciprocal rotator. This angled grating coupler design enables a simpler and cheaper to manufacture configuration, as described further with respect to FIGS. 9, 11, 12, and, for example.

Figure 1C:
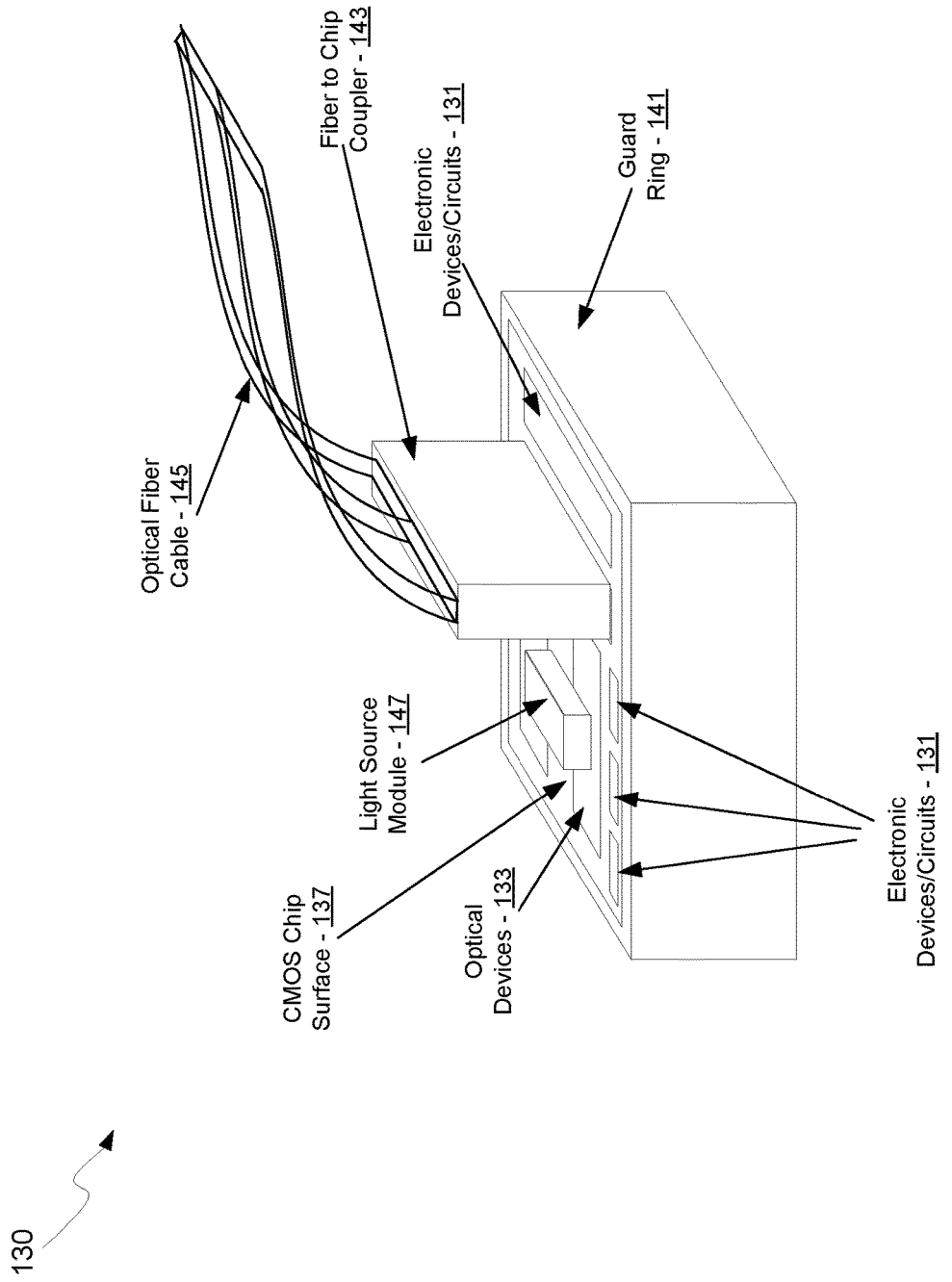
FIG. 1C is a diagram illustrating a CMOS chip coupled to an optical fiber cable, in accordance with an example embodiment of the disclosure.

FIG. 1C is a diagram illustrating a CMOS chip coupled to an optical fiber cable, in accordance with an exemplary embodiment of the disclosure. Referring to FIG. 1C, there is shown the CMOS chip 130 comprising the CMOS chip surface 137, and the CMOS guard ring 141. There is also shown a fiber-to-chip coupler 143, an optical fiber cable 145, and an optical source assembly 147.

The CMOS chip 130 comprising the electronic devices/circuits 131, the optical and optoelectronic devices 133, the light source interface 135, the CMOS chip surface 137, and the CMOS guard ring 141 may be as described with respect to FIG. 1B.

In an example embodiment, the optical fiber cable may be affixed, via epoxy for example, to the CMOS chip surface 137. The fiber chip coupler 143 enables the physical coupling of the optical fiber cable 145 to the CMOS chip 130.

In an example scenario, the light source interface 135 upon which the light source module 147 is affixed may comprise angled grating couplers that select polarization near 45° with respect to the plane of incidence. Therefore, the light source module 147 may be configured without a reciprocal rotator and still not suffer from back-reflections. This angled grating coupler design enables a simpler and cheaper to manufacture configuration, as described further with respect to FIGS. 9, 11, 12, and, for example.

Figure 2A:
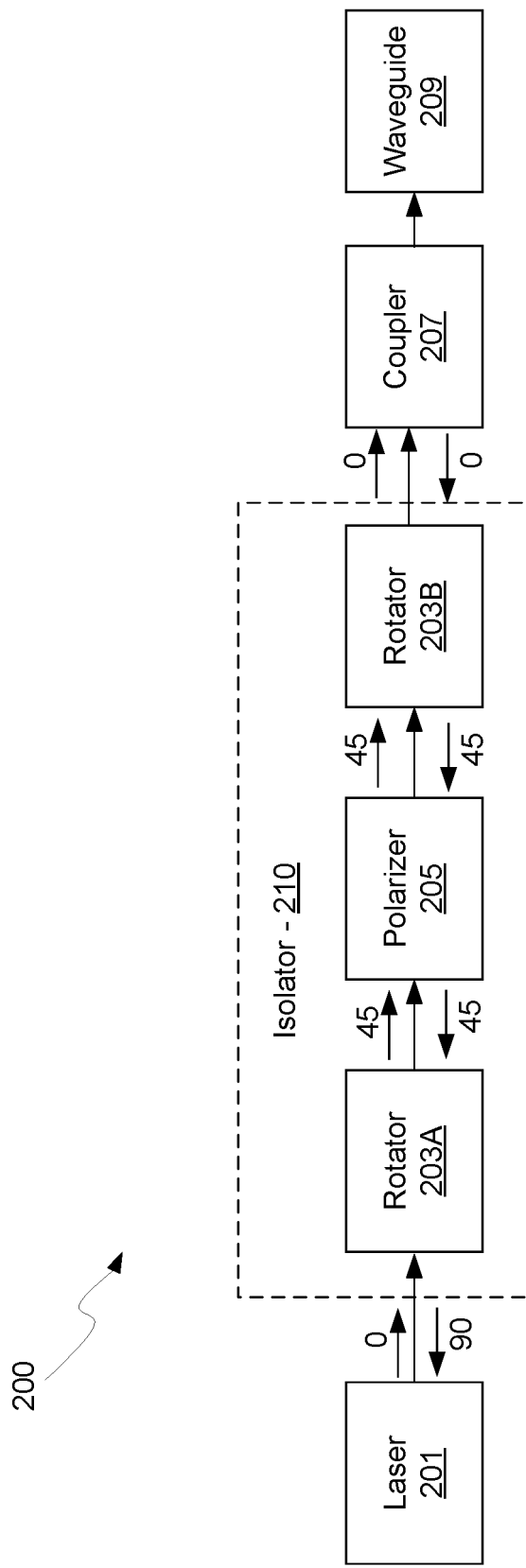
FIG. 2A illustrates a system coupling light from a laser chip to a waveguide on a transceiver chip, in accordance with an example embodiment of the disclosure.

FIG. 2A illustrates a system coupling light from a laser chip to a waveguide on a transceiver chip, in accordance with an example embodiment of the disclosure. Referring to FIG. 2A, there is shown a coupling system 200 comprising a laser 201, an isolator 210, a coupler 207, and a waveguide 209. The laser 201 may be substantially similar to the laser 101 described with respect to FIG. 1A, and may comprise a compound semiconductor laser chip, for example, that may be mounted within a light source assembly or module.

The light source assembly may also comprise the isolator 210, which may comprise rotators 203A and 203B, and a polarizer 205. The rotators 203A may comprise a non-reciprocal rotator, such as a Faraday rotator, for example, and a reciprocal rotator. The combination of the rotators 203A/B and the polarizer 205 may provide isolation from unwanted optical reflections back to the laser 201, which can lead to output power fluctuations.

Figure 2B:
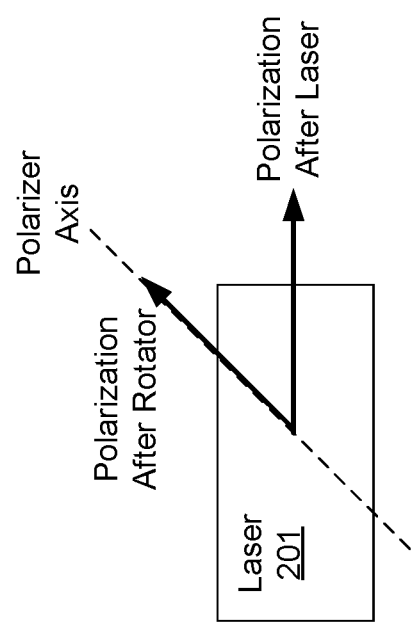
FIG. 2B. Illustrates the polarization of light in a system with an isolator, in accordance with an example embodiment of the disclosure.

FIG. 2B. Illustrates the polarization of light in a system with an isolator, in accordance with an example embodiment of the disclosure. The view shown in FIG. 2B is that from an observer directly behind the laser 201, where the polarization of the optical signal transmitted from the laser is in the horizontal plane of the device, as is typical for a semiconductor laser. However, this is merely as an example to show how the polarization changes as it passes through the rotator.

The rotator rotates the polarization of the light by 45° and the axis of the polarizer would then be oriented so that it allows light through whose polarization is along this direction. In this illustration, the rotation is in the counter-clockwise direction; however, the polarization may be rotated in the clockwise direction.

Figure 3:
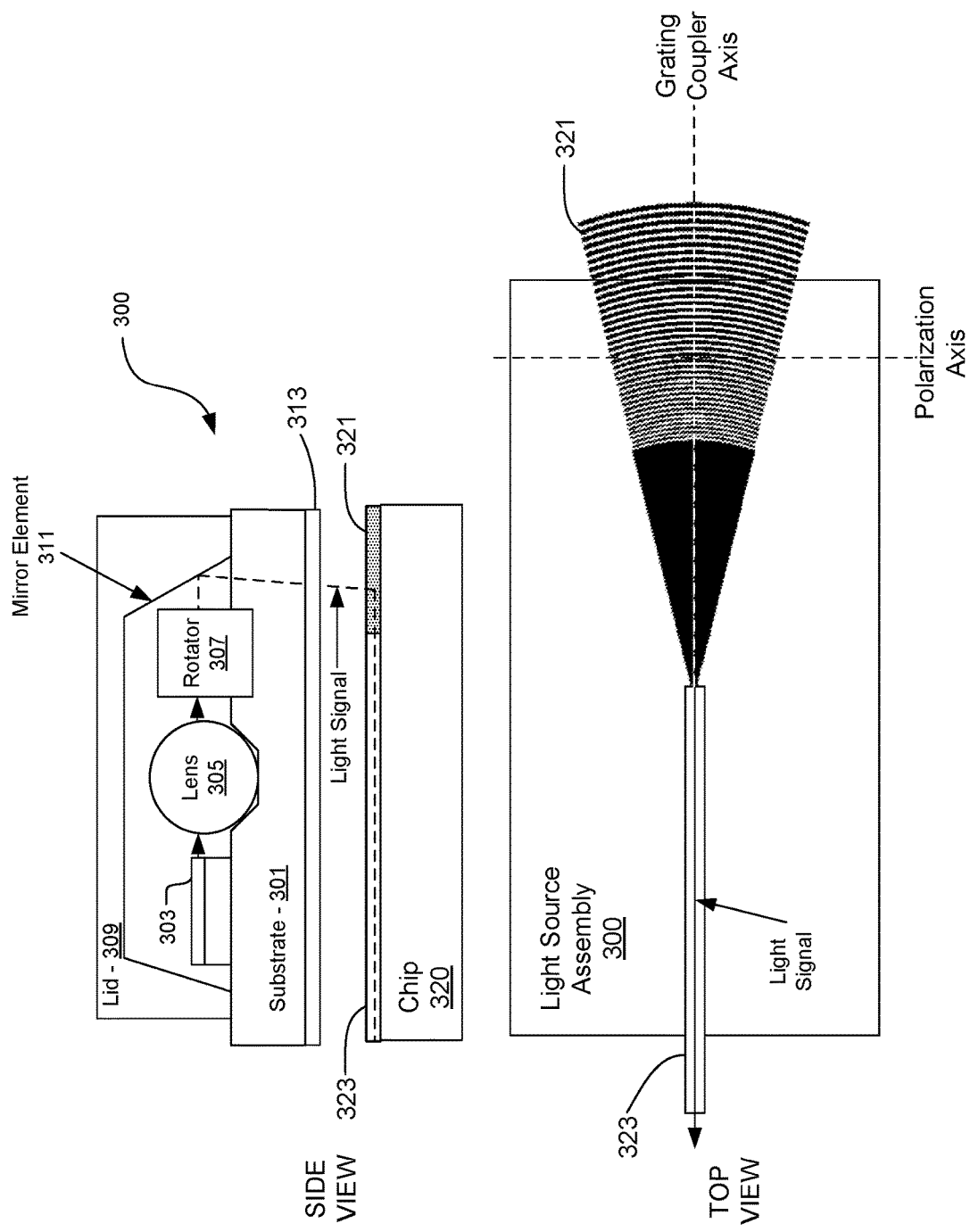
FIG. 3 illustrates side and top views of a light source assembly with a grating coupler, in accordance with an example embodiment of the disclosure.

FIG. 3 illustrates side and top views of a light source assembly with a grating coupler, in accordance with an example embodiment of the disclosure. An example of a hybrid light source that may be used in whole or in part to support the light source assembly of the present disclosure, is described in U.S. Pat. No. 8,168,939, which is hereby incorporated by reference in its entirety. Referring to FIG. 3, there is shown a light source assembly 300 and a chip 320.

The light source assembly 300 may comprise a support substrate 301, a laser 303, a lens 305, a rotator 307, a lid 309, a mirror element 311, and a reciprocal rotator 313. The support substrate 301 may comprise a silicon optical bench, for example, that may support optical, electronic, and optoelectronic components and may be micro-machined out of a silicon substrate, for example. In an example scenario, the reciprocal rotator 313 may comprise a dielectric stack formed on the bottom of the substrate 301, and may comprise quartz, for example. The reciprocal rotator 313 may be formed when the substrate 301 is still in wafer form, thereby reducing processing complexity and cost. The mirror element 311 may comprise a turning mirror and may be formed in the lid 309, or may comprise a reflective structure affixed to the lid 309.

The lens 305 may comprise a spherical ball lens, for example, that may be operable to focus light from the laser 303, and the rotator 307 may comprise a Faraday rotator, for example, for rotating the polarization of light focused by the lens 305. The laser 303 may comprise a compound semiconductor laser chip, for example, that may be mounted on a heat sink on the substrate 301.

The chip 320 may comprise a photonic or optoelectronic chip, such as a silicon CMOS photonics chip, for example, with an optoelectronic transceiver within which a grating coupler 321 and waveguide 323 may be formed. The grating coupler 321 may comprise an array of waveguides and/or discrete scatterers that direct an optical signal received from the light source assembly 300 into the waveguide 323. The waveguide 323 may comprise a higher dielectric constant material surrounded by lower dielectric material, or air, that guides an optical signal along the top surface of the chip 320.

In an example embodiment, the grating coupler 321 comprises a polarization-selective grating coupler. The turning mirror 311 in the light source assembly 300 may project the polarized laser beam towards the chip 320 so that the beam directed onto the grating coupler 321 is close to normal incidence to the chip. The grating coupler 321 may couple the light into the waveguide 323 fabricated on the transceiver chip 320. FIG. 3 illustrates side and top views of the system, including the light source assembly and the grating coupler. The light signal path (drawn using a dashed line) defines the plane of incidence of the light beam.

In this configuration, the polarizer functionality may be provided by the grating coupler itself, by virtue of its polarization selectivity. The reciprocal rotator 313 may rotate the polarization of the reflected light to orient it with the grating coupler 321. The grating coupler 321 preferentially couples light polarized perpendicular to the plane of incidence. In an example embodiment, the system comprising the light source assembly 300 and the grating coupler 321 would in principle allow the removal of a separate polarizer element, as shown in FIG. 4, reducing complexity and cost.

Figure 4:
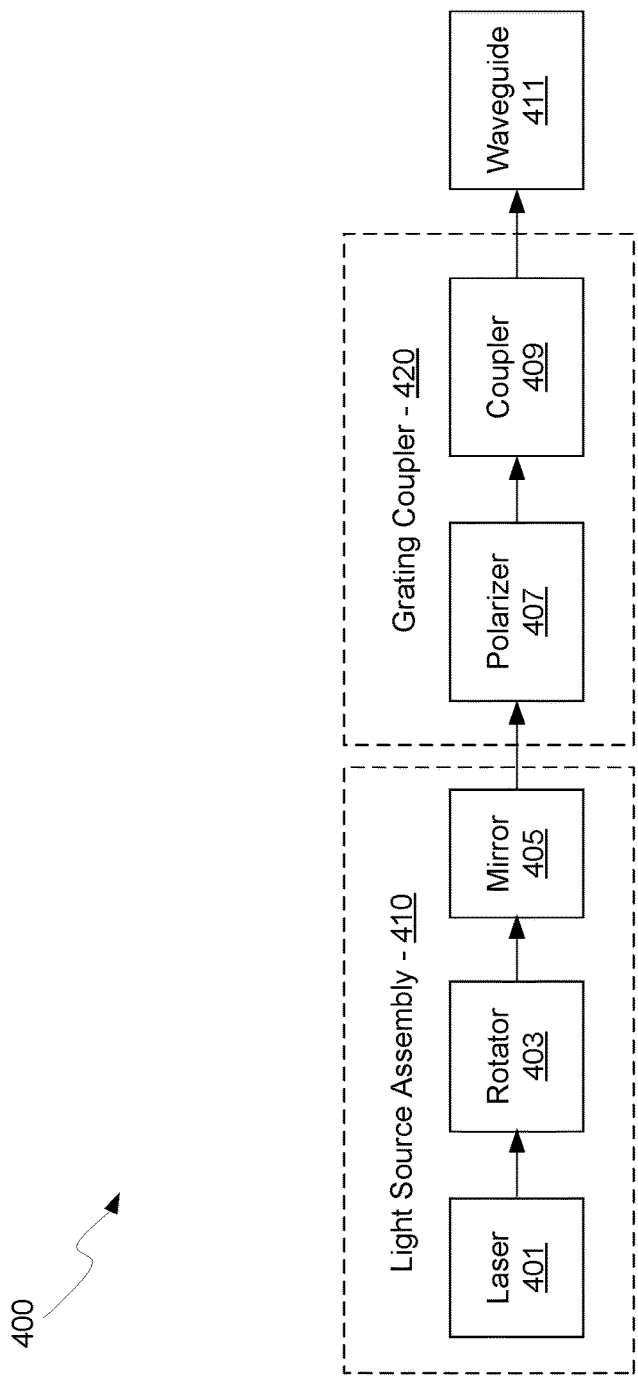
FIG. 4 illustrates a light source assembly without a polarizer, in accordance with an example embodiment of the disclosure.

FIG. 4 illustrates a light source assembly without a polarizer, in accordance with an example embodiment of the disclosure. Referring to FIG. 4, there is shown a light source assembly 410 and a grating coupler 420. In this example, the light source assembly comprises a laser 401, a rotator 403, and a mirror 405, while the grating coupler 420 comprises a polarizer 407 and a coupler 409.

In this example, the grating coupler 420 itself provides the polarizer function in that only light that is polarized perpendicular to the grating coupler axis, as shown in FIG. 3, is coupled to the waveguide 411. As stated above, incorporating the polarizer functionality in the grating coupler 420 reduces complexity and cost.

In practice, however, the polarization-selective grating coupler design that preferentially couples light polarized perpendicular to the plane of incidence is incompatible with how the light is emitted from a light source assembly that only contains a lens, rotator, and mirror. This occurs because the polarizer provided by the grating coupler is oriented perpendicular to the plane of incidence instead of 45° from it. For this reason, a further element is added to the light source assembly, a reciprocal rotator, as shown in FIG. 5, which corrects for the 45° polarization rotation affected by the non-reciprocal rotator.

Figure 5:
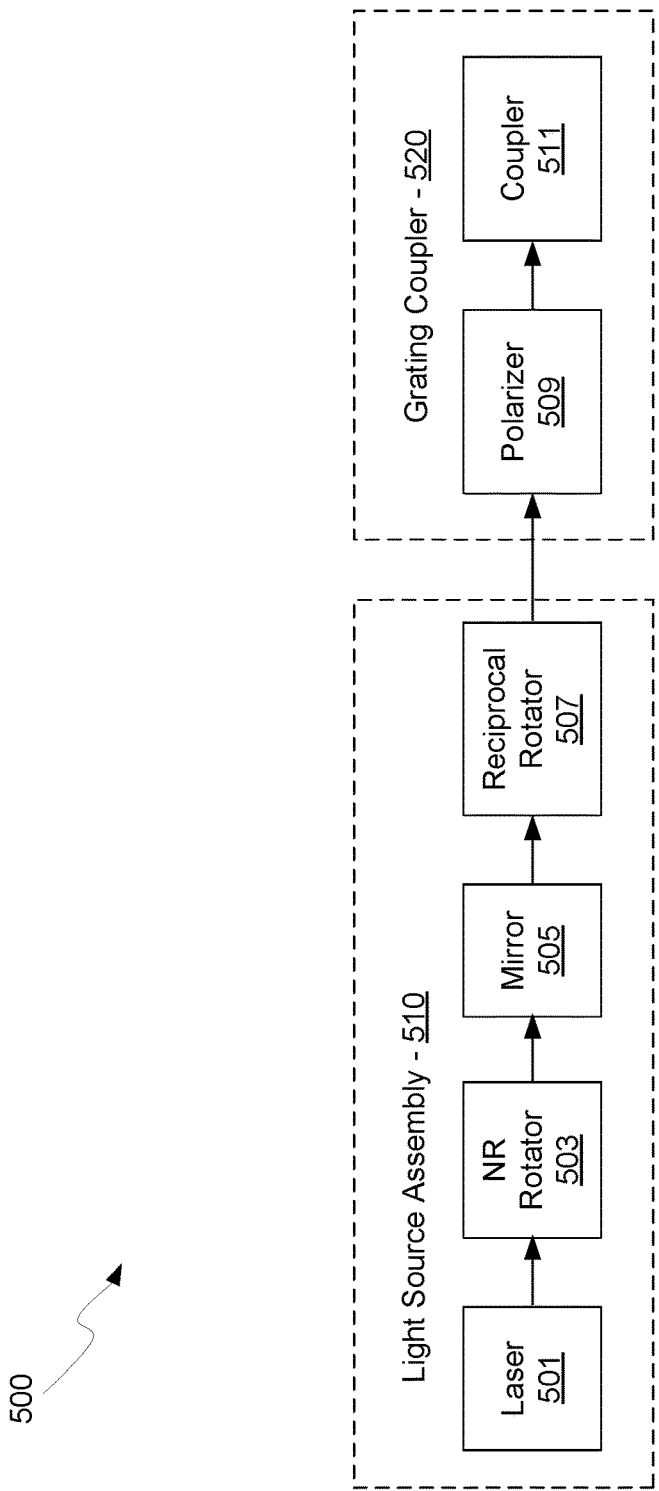
FIG. 5 illustrates a light source assembly with both non-reciprocal and reciprocal rotators, in accordance with an example embodiment of the disclosure.

FIG. 5 illustrates a light source assembly with both non-reciprocal and reciprocal rotators, in accordance with an example embodiment of the disclosure. Referring to FIG. 5, there is shown a light source assembly 510 and a grating coupler 520. In FIG. 5, the waveguide has been dropped from the figure for simplicity, but may share any and all aspects of FIGS. 1A-4.

The light source assembly 510 comprises a laser 501, a non-reciprocal rotator 503, a mirror 505, and a reciprocal rotator 507. The grating coupler 520 may comprise a polarizer 509 and a coupler 511. To couple an optical signal, existing polarization sensitive grating couplers receive optical signals at a polarization angle of 0°, meaning that angle between the grating coupler axis and the waveguide axis is zero and the angle between the optical signal polarization, i.e., the optical signal that is coupled to the waveguide, and the grating coupler axis is 90°.

Figure 6:
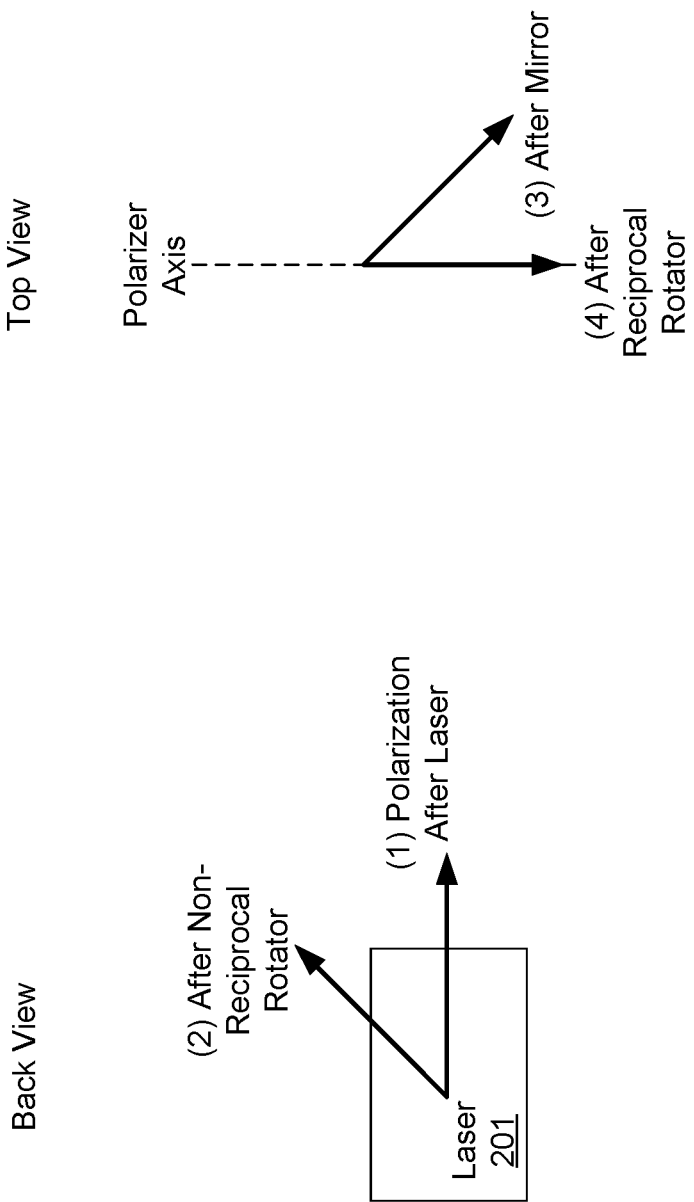
FIG. 6 illustrates the polarization direction after the individual optical elements in the system of FIG. 5.

FIG. 6 illustrates the polarization direction after the individual optical elements in the system of FIG. 5. Referring to FIG. 6, two views are shown: a back view, from the vantage point of an observer positioned behind the laser, and a top view.

The polarization of the optical signal emitted from the laser 201 is shown by polarization (1), which is parallel to the horizontal plane in the back view of FIG. 6. After the non-reciprocal rotator 503, the polarization is rotated 45° in the vertical direction as shown by polarization (2) in the back view of FIG. 6. Following the mirror 505 in the light source assembly 510, the polarization of the optical signal is shown by the polarization (3) in the top view of FIG. 6. Finally, after the reciprocal rotator 507, which may comprise a dielectric stack formed in or on the substrate of FIG. 3, for example, the resulting polarization is shown by (4) in the top view of FIG. 6.

In summary, even though the polarization-selective grating coupler 520 allows the removal of the polarizer element, the reciprocal rotator 507 is used to align the polarization of the optical signal with the polarization axis of the grating coupler 520.

In an example scenario, an angled grating coupler that selects polarization near 45° with respect to the plane of incidence may therefore be compatible with a light source assembly without a reciprocal rotator. This angled grating coupler design enables the simpler and cheaper to manufacture configuration shown in FIG. 7

Figure 7:
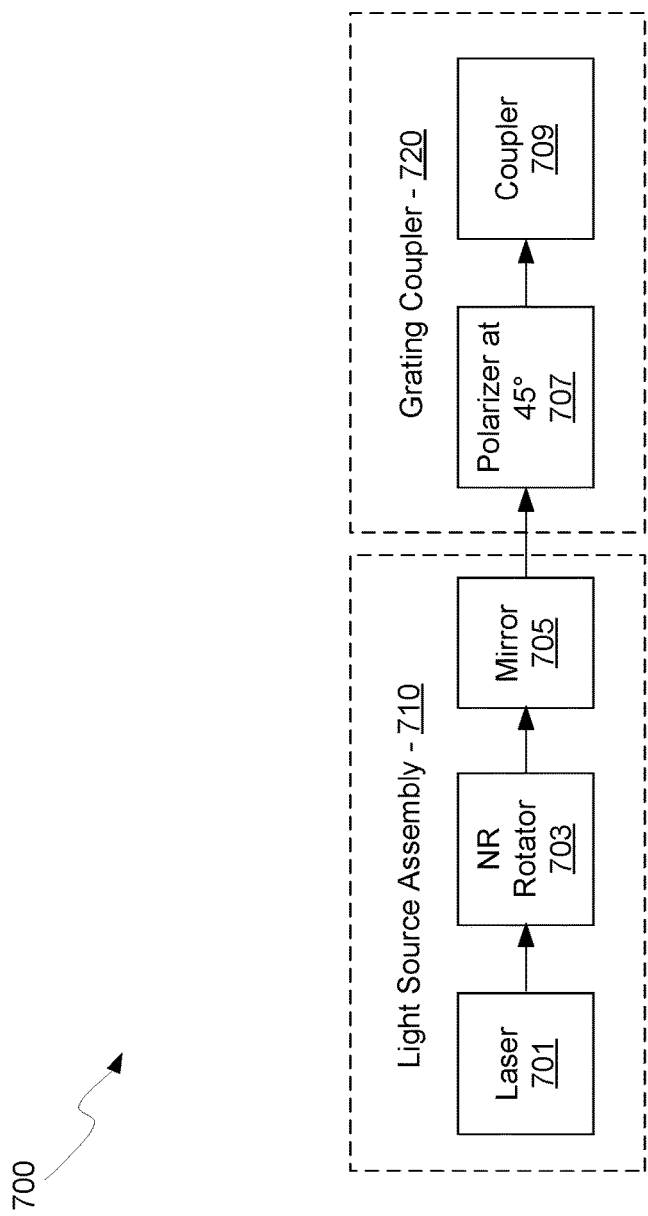
FIG. 7 illustrates a light source assembly without a reciprocal rotator coupling an optical signal into an angled grating coupler, in accordance with an example embodiment of the disclosure.

FIG. 7 illustrates a light source assembly without a reciprocal rotator coupling an optical signal into an angled grating coupler, in accordance with an example embodiment of the disclosure. The example system illustrated in FIG. 7 may, for example, share any or all functional aspects discussed previously with regard to FIGS. 1A-6. Referring to FIG. 7, there is shown a light source assembly 710 and an angled grating coupler 720. The light source assembly 710 may be simplified from previously described assemblies as it comprises a laser 701, a non-reciprocal rotator 703, and a mirror 705. The angled grating coupler 720 comprises a polarizer 707 with a polarization axis at 45° from the angle of incidence and a coupler 709.

The angled grating coupler 720 may comprise curved grates whose tangential planes at the grating coupler axis are not perpendicular to the grating coupler axis. This is described further with respect to FIGS. 9 and 11, for example. Because the angled grating coupler 720 couples light with an angle of incidence at 45° from the grating coupler axis, a second rotator is not used.

Figure 8:
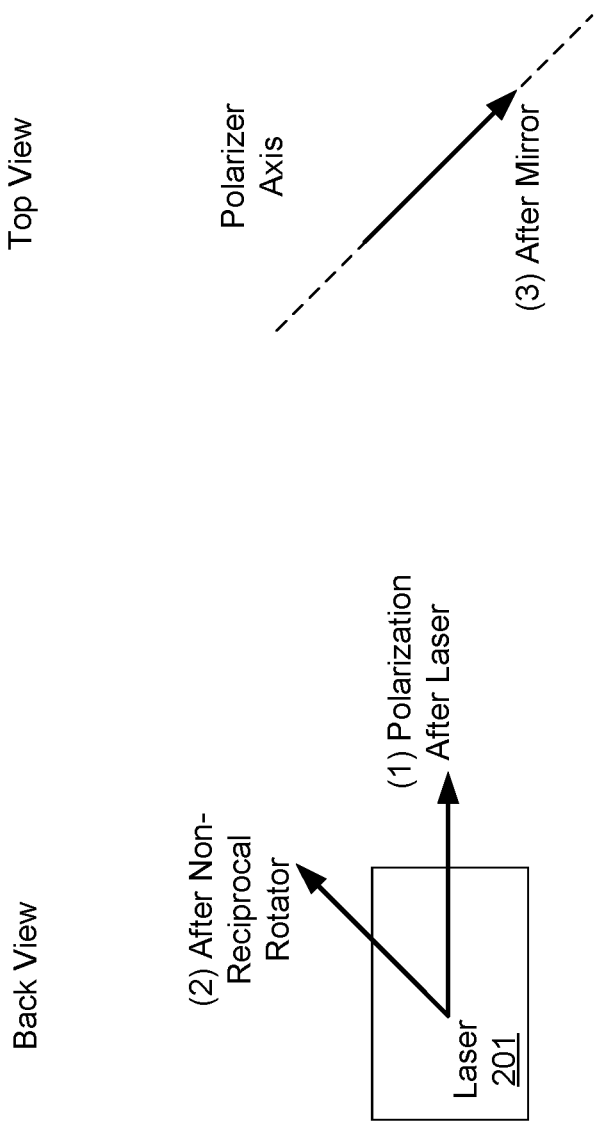
FIG. 8 illustrates the polarization direction after the individual optical elements in the system of FIG. 7 employing an angled grating coupler.

FIG. 8 illustrates the polarization direction after the individual optical elements in the system of FIG. 7 employing an angled grating coupler. Referring to FIG. 8, the polarization of the optical signal emitted from the laser 201 is shown by polarization (1), which is parallel to the horizontal plane in the back view of FIG. 8. After the non-reciprocal rotator 703, the polarization is rotated 45° in the vertical direction as shown by polarization (2) in the back view of FIG. 8. Following the mirror 705 in the light source assembly 710, the polarization of the optical signal is shown by the polarization (3) in the top view of FIG. 7.

In general, the angled grating coupler provides a way to couple an optical signal to an integrated optics chip in the special case where the polarization of the light is not perpendicular to the plane of incidence. Even though the particular example shown relates to coupling a light signal whose polarization is at 45° to the plane of incidence, the method is applicable to a system where this angle is arbitrary or otherwise different or determined.

Figure 9:
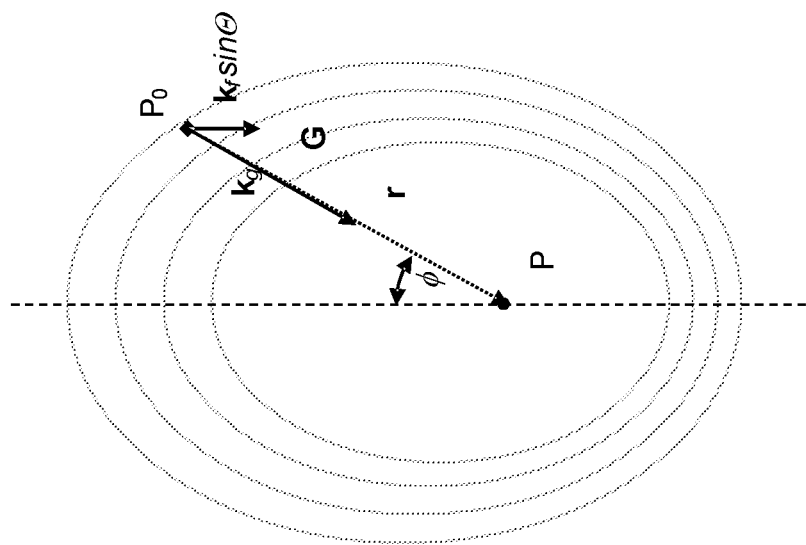
FIG. 9 illustrates wavevectors for grating coupler design, in accordance with an example embodiment of the disclosure.

FIG. 9 illustrates wavevectors for grating coupler design, in accordance with an example embodiment of the disclosure. A grating coupler can transform the free-space light beam emitted from a laser to the guided mode in the waveguide on the transceiver chip using a diffractive grating etched into the chip. In an example scenario, a non-angled grating coupler comprises an array of etched linear or curved features that are substantially perpendicular to the plane of incidence of the laser light. To describe this design, the following definitions may be used:

$\theta$=Incidence angle (angle between the normal to the chip and the light beam in the vicinity of the grating coupler)
$k_f$=Fiber mode wavevector
$k_g$=Waveguide mode wavevector
$G$=Reciprocal lattice vector of the locally periodic grating
$\lambda$=Free space wavelength of light emitted from the laser
$n_e$=Effective index of light propagation inside the grating The light incident on the grating coupler may be focused to the entrance of the waveguide, which is shown in the figure as point P. Light scattering is shown in FIG. 9 from point $P_0$ with r as the vector $P_0P$ and $\phi$ as the angle.

The phase matching condition can be written as $k_g = k_f + G$, or, $$k_g \cdot \vec{r} - k_f \sin\theta \cdot \vec{r} = N \cdot 2\pi$$

where N is an arbitrary integer.

This leads to the equation for a family of confocal ellipses with one of its focal points at P:

$$r = \frac{N\lambda_e}{1 - e\cos\phi}$$

where e is the eccentricity of the ellipses $$e = \frac{n_f \sin\theta}{n_e}$$

and $$\lambda_e = \lambda/n_e.$$

The grating is drawn along the ellipses (gray lines in the drawing) and the individual grates correspond to different values of the integer N. The non-angled grating coupler is oriented in such a way that its symmetry axis, i.e., the grating coupler axis, and the waveguide are along the plane of incidence.

Figure 10:
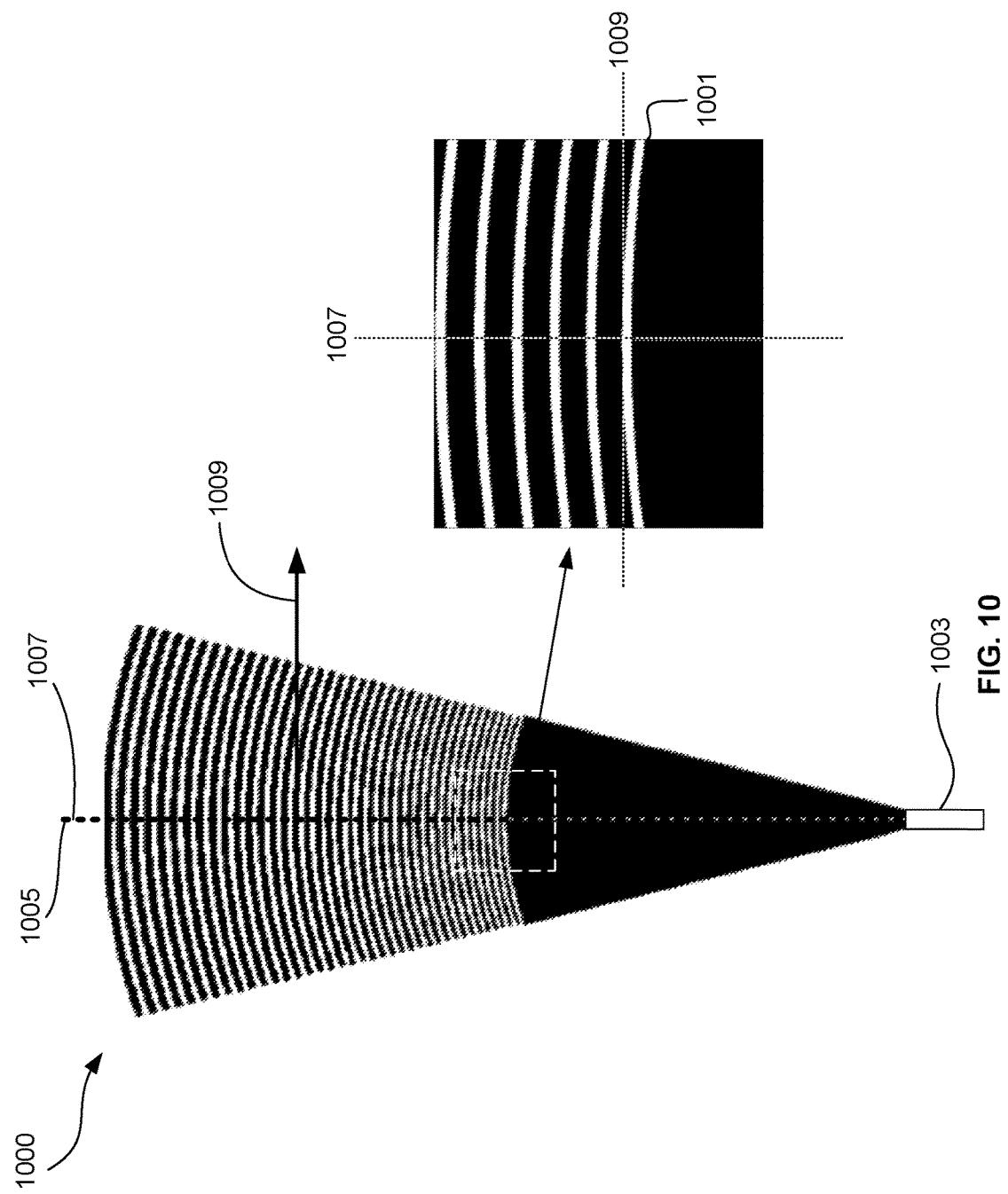
FIG. 10 illustrates a non-angled grating coupler in accordance with an example embodiment of the disclosure.

FIG. 10 illustrates a non-angled grating coupler in accordance with an example embodiment of the disclosure. Referring to FIG. 10, there is shown a grating coupler 1000 and a waveguide 1003. There is also shown a plane of incidence 1005, grating coupler axis 1007, and a polarization vector 1009. In existing grating couplers, the plane of incidence 1005 coincides with the grating coupler axis 1007 so that optical signals can be coupled into the waveguide, i.e., the polarization vector 1009 is 90° from the grating coupler axis 1007 where the waveguide 1003 extends out of the grating coupler 1000.

The grating coupler 1000 comprises an array of curved grates 1001, and as shown in FIG. 10, including in the inset that shows a magnified view of the grating coupler 1000, the tangential planes of the grates 1001 at the grating coupler axis 1007 are perpendicular to the grating coupler axis 1007. Here, only one section of the ellipses that is near the plane of incidence is selected to draw the grating that couples light to the waveguide. In this scenario, the plane of incidence 1005 is the same as the grating coupler axis 1007, indicated by the 0° difference in angle between the plane of incidence 1005 and the grating coupler axis 1007.

Figure 11:
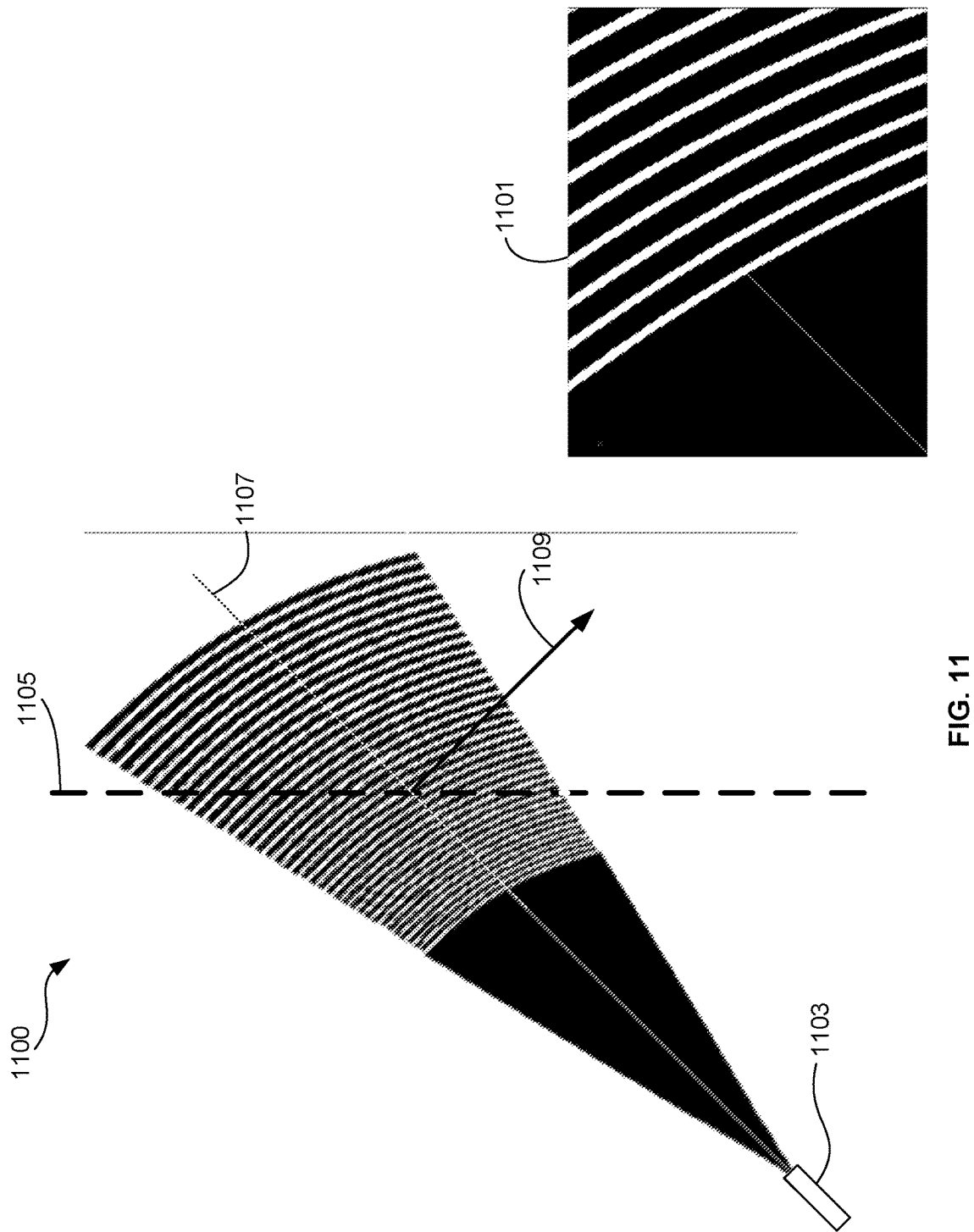
FIG. 11 illustrates an angled grating coupler in accordance with an example embodiment of the disclosure.

FIG. 11 illustrates an angled grating coupler in accordance with an example embodiment of the disclosure. Referring to FIG. 11, there is shown an angled grating coupler 1100 and a waveguide 1103. There is also shown a plane of incidence 1105, grating coupler axis 1107, and a polarization vector 1109. As shown in FIG. 11, the waveguide 1103 is still oriented perpendicular to the polarization vector 1109, as would be needed to couple an optical signal in to the waveguide 1103. However, in this example scenario, the grating coupler 1100 no longer has an exact axis of symmetry about the grating coupler axis 1107, even though the axis of the grating coupler can be defined as the extension of the waveguide.

The angled grating coupler 1100, in one embodiment, may be configured by selecting the portion of the ellipses of FIG. 9 that is not along the plane of incidence but is near the line that encloses an angle with it that is substantially close to 45°. Accordingly, the plane of incidence 1105 is at an angle of 45° from the grating coupler axis 1107.

Although a 45° example is shown, this method can be extended to design grating couplers that accept light whose polarization is at an arbitrary or otherwise determined angle with respect to the plane of incidence, not only at 45°.

By decoupling the waveguide orientation from the plane of incidence, we obtain an optical element that can accept light whose polarization is not necessarily perpendicular to the plane of incidence of the light. This angled grating coupler design can be used, for example, in the configuration shown in FIG. 12.

Figure 12:
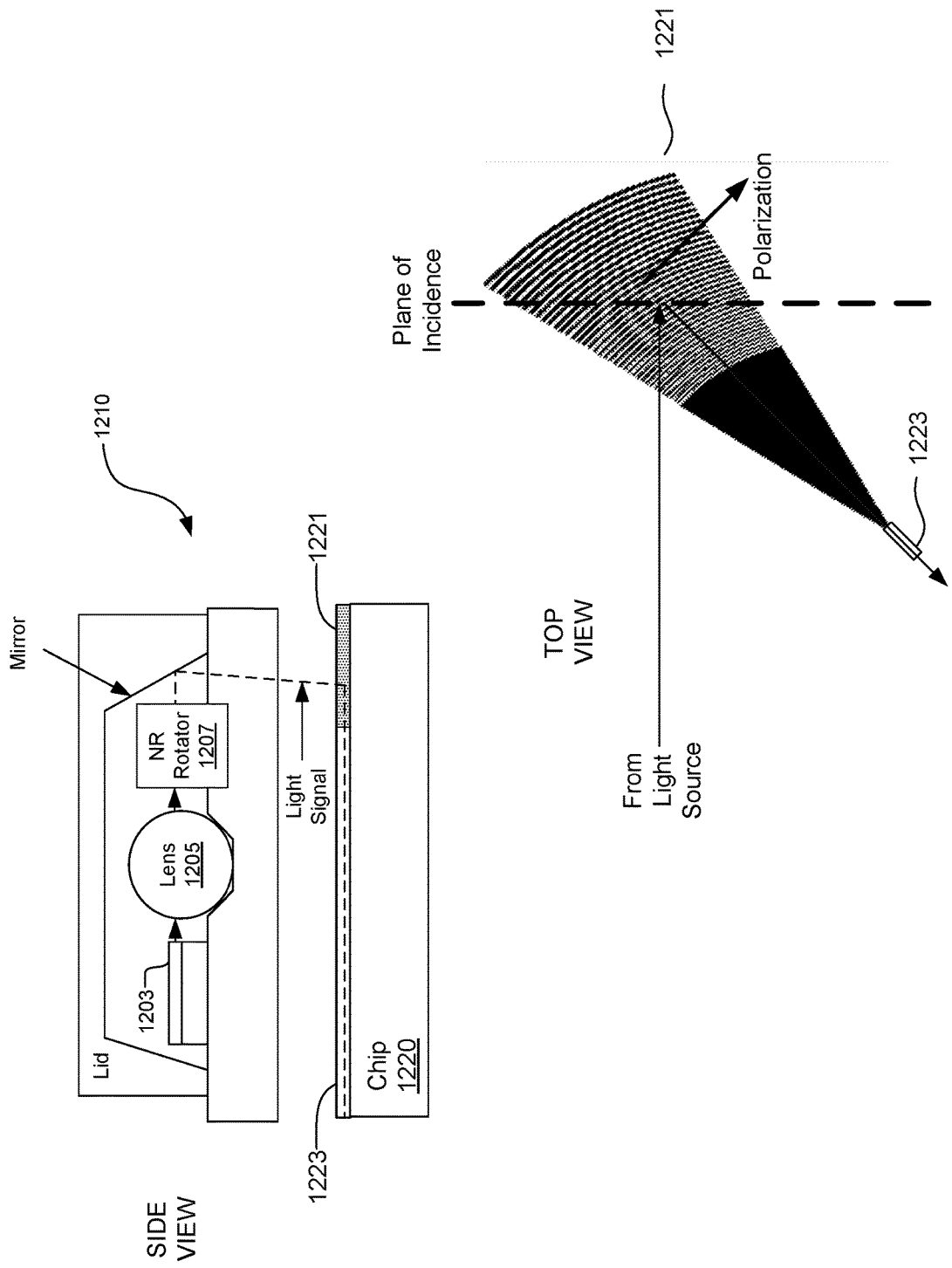
FIG. 12 illustrates a light source assembly and an angled grating coupler, in accordance with an example embodiment of the disclosure.

FIG. 12 illustrates a light source assembly and an angled grating coupler, in accordance with an example embodiment of the disclosure. The example system illustrated in FIG. 12 may, for example, share any or all functional aspects discussed previously with regard to FIGS. 1A-11. Referring to FIG. 12, there is shown a light source assembly 1210 and a chip 1220 comprising a grating coupler 1221 and a waveguide 1223. The light source assembly 1210 may comprise a laser 1203, a lens 1205, and a rotator 1207.

The lens 1205 may comprise a spherical ball lens, for example, and the rotator 1207 may comprise a non-reciprocal rotator, such as a Faraday rotator, for example, for rotating the polarization of light focused by the lens 1205.

The chip 1220 may comprise a photonic or optoelectronic chip, such as a silicon CMOS photonics chip, for example, with an optoelectronic transceiver within which a grating coupler 1221 and waveguide 1223 may be formed. The grating coupler 1221 may comprise an array of waveguides and/or discrete scatterers that direct an optical signal received from the light source assembly 1210 into the waveguide 1223. The waveguide 1223 may comprise a higher dielectric constant material surrounded by lower dielectric material, or air, that guides an optical signal along the top surface of the chip 1220.

The turning mirror in the light source assembly 1210 may project the rotated polarization laser beam towards the chip 1220 so that the beam may be directed onto the grating coupler 1221. The grating coupler 1221 may couple the light into the waveguide 1223 fabricated on the transceiver chip 1220. FIG. 12 illustrates side and top views of the system, including the light source assembly 1210 and the grating coupler 1221. The light signal path (drawn using a dashed line) defines the plane of incidence of the light beam.

In an example embodiment, the grating coupler 1221 comprises an angled grating coupler such that a second rotator is not needed in the light source assembly 1210, as is needed for existing grating couplers. The angled grating coupler 1221 provides a way to couple an optical signal to an integrated optics chip in the special case where the polarization of the light is not perpendicular to the plane of incidence. Even though in the particular example shown relates to coupling a light signal whose polarization is at 45° to the plane of incidence, the method is applicable to a system where this angle is arbitrary or otherwise determined.

Figure 13:
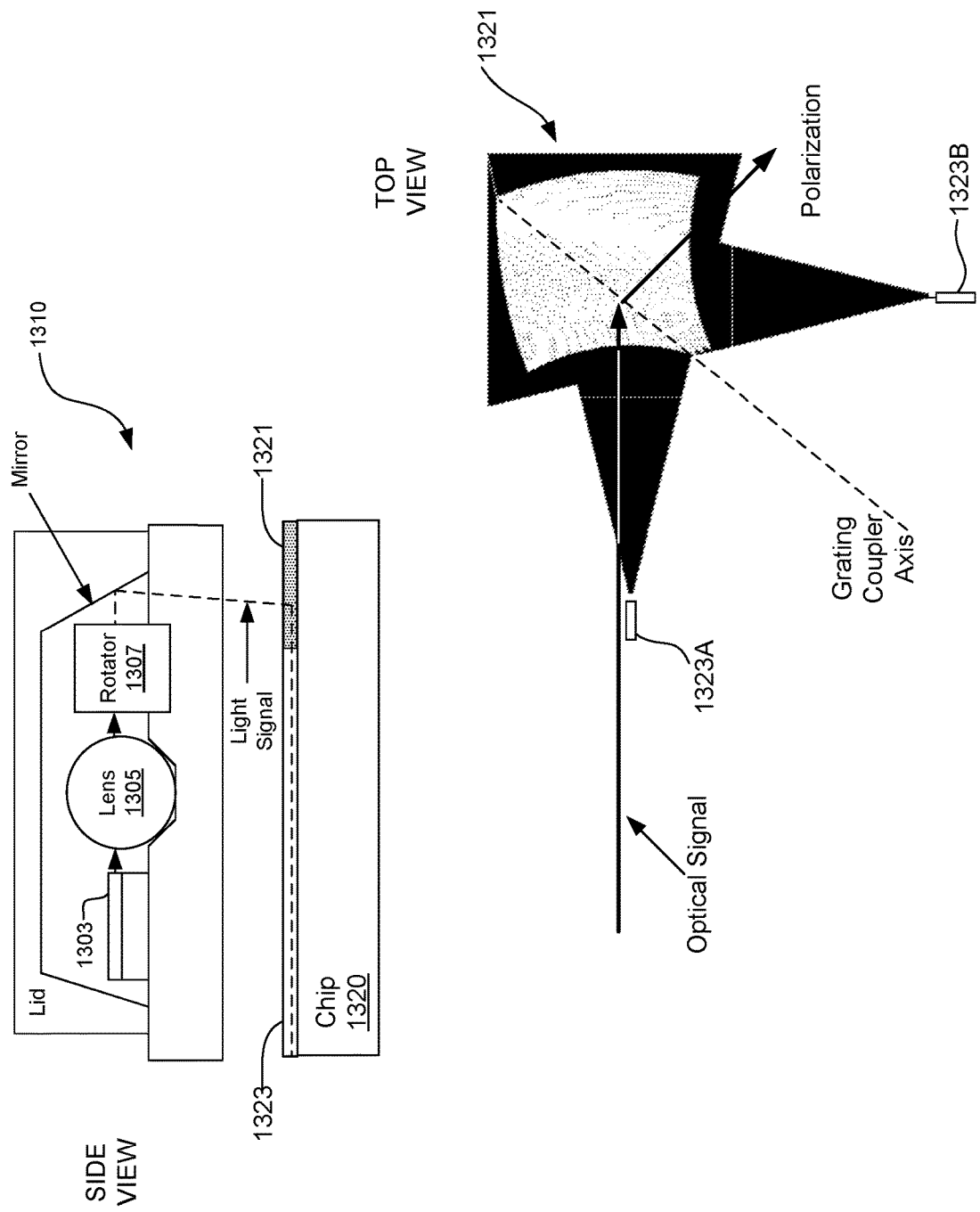
FIG. 13 illustrates a two output angled grating coupler, in accordance with an example embodiment of the disclosure.

FIG. 13 illustrates a two-output angled grating coupler, in accordance with an example embodiment of the disclosure. The example system illustrated in FIG. 13 may, for example, share any or all functional aspects discussed previously with regard to FIGS. 1A-12. Referring to FIG. 13, the configuration shown may be similar to that shown in FIG. 12, but with a two-output angled grating coupler 1321.

It should be noted that the optical signal from the light source assembly in the top view in FIG. 13 is shown slightly offset from the waveguide 1323A for clarity, so as not to be confused with an optical signal coming into the grating coupler via the waveguide 1323A. As shown in the side view of FIG. 13, the optical signal from the light source assembly 1310 impinges on the two-output angled grating coupler 1321 from the top.

In this example, two angled grating couplers may be overlaid to form a two-dimensional grating, manufactured by etching a two-dimensional pattern into the substrate on which the optical integrated circuit is formed, for example. This type of grating coupler does not necessarily exhibit polarization selectivity, but splits the optical power from the input optical signal into two separate waveguides, in a ratio that is based on the polarization of the incident light beam. The two-output angled grating coupler 1321 may be used in a parallel multi-channel transceiver, for example, where one light source provides light for more than one channel. In the particular case illustrated in FIG. 13, the axis of the grating coupler is approximately at 45° to the plane of incidence and the grating coupler splits the optical power approximately evenly between the two waveguides.

The two-output grating coupler 1321 may be based on the overlay of two different angled grating couplers, one of which is designed for a 45° angle between the polarization vector and the plane of incidence, and the other is designed for a 135° angle. This design is thus distinct from polarization-splitting grating couplers where the plane of incidence is along the plane of incidence. The example two-output grating coupler 1321 shown in FIG. 13 also does not have an exact axis of symmetry.

As an added benefit, the reflection from an angled grating coupler back towards the laser 1303 is reduced as compared to a non-angled grating coupler. One reason for this is that the grates of the grating coupler are perpendicular to the direction of the light propagation in the non-angled case but are not so in the angled case. Therefore any potential reflections from the grate closest to the waveguide will not propagate back directly towards the laser but will be deflected by a small angle.

This reduced reflection from the grating coupler may enable the removal of the rotator altogether because optical isolation may no longer be necessary to stabilize the laser power. Using a reciprocal rotator may provide a cost-advantage over the non-reciprocal rotator material, and also a reduction in assembly cost, because typically the non-reciprocal rotator has to be poled using a high magnetic field to operate.

Figure 14:
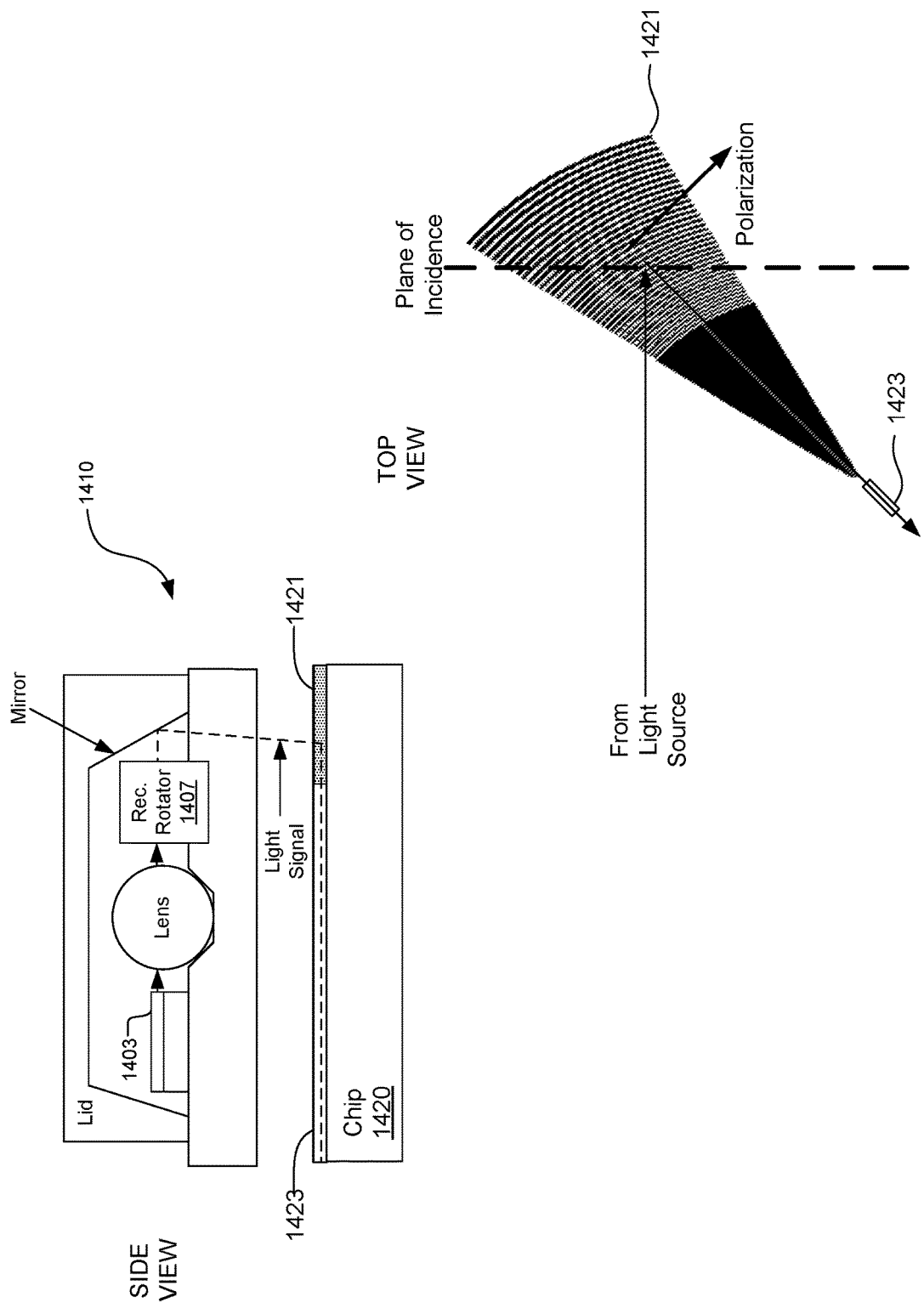
FIG. 14 illustrates a light source assembly with a reciprocal rotator that couples light to an angled grating coupler, in accordance with an example embodiment of the disclosure.

FIG. 14 illustrates a light source assembly with a reciprocal rotator that couples light to an angled grating coupler, in accordance with an example embodiment of the disclosure. The example system illustrated in FIG. 14 may, for example, share any or all functional aspects discussed previously with regard to FIGS. 1A-13. Referring to FIG. 14, there is shown a light source assembly 1410 with the non-reciprocal rotator removed and replaced by a reciprocal rotator 1407. The reciprocal rotator 1407 enables the use of the angled grating coupler, which in turn reduces reflection back to the laser, which was the requirement for removing the non-reciprocal rotator in the first place. Since isolation is not needed in this embodiment, the rotator need not rotate the polarization by 45° but can instead rotate it by any angle, and the angled grating coupler can be designed accordingly.

Figure 15:
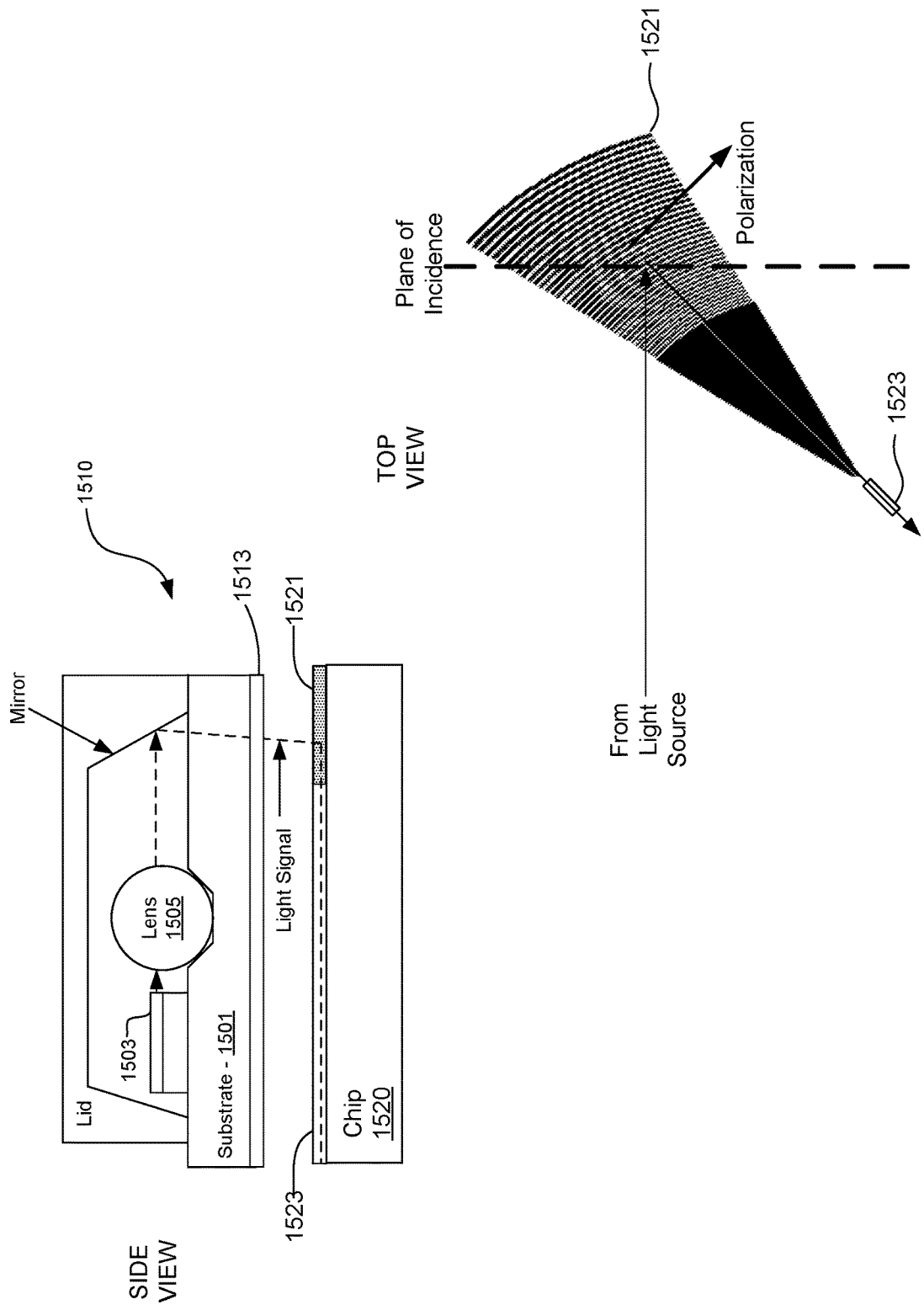
FIG. 15 illustrates a light source assembly with a reciprocal rotator, and an angled grating coupler, in accordance with an example embodiment of the disclosure.

FIG. 15 illustrates a light source assembly with a reciprocal rotator, and an angled grating coupler, in accordance with an example embodiment of the disclosure. The example system illustrated in FIG. 15 may, for example, share any or all functional aspects discussed previously with regard to FIGS. 1A-14. Referring to FIG. 15, there is shown a light source assembly 1510 without a rotator in the substrate 1501 beyond the lens 1505 but instead a reciprocal rotator 1513 is formed on the bottom of the substrate. One advantage of this configuration could be that the rotator could be bonded to the substrate in wafer form, and therefore it would not have to be added individually for each laser assembly.

The reciprocal rotator 1513 enables the use of the angled grating coupler, which in turn reduces reflection back to the laser, which was the requirement for removing the non-reciprocal rotator in the first place. Since isolation is not needed in this embodiment, the rotator need not rotate the polarization by 45° but can instead rotate it by any angle, and the angled grating coupler can be designed accordingly.

The disclosure is not restricted to the particular embodiments described, but the design principle can be extended to various types of grating couplers and light source assemblies, such as couplers manufactured in various material platforms, couplers with apodized gratings, couplers with grating curvatures that are not exactly described by ellipses, couplers with substantially straight gratings, coupler whose waveguides are not at 45° to the plane of incidence, and other types of grating couplers not explicitly listed here.

In an example embodiment, a method and system are disclosed for coupling a light source assembly to an optical integrated circuit. In this regard, aspects of the disclosure may comprise a system comprising a laser source assembly comprising a laser, a rotator, and a mirror, said laser source assembly coupled to a die comprising an angled grating coupler and a waveguide. An optical signal may be generated utilizing the laser, the polarization of the optical signal may be rotated utilizing the rotator, the rotated optical signal may be reflected onto the grating coupler on the die, and the optical signal may be coupled to the waveguide.

The angle between a grating coupler axis that is parallel to the waveguide and a plane of incidence of the optical signal reflected to the angled grating coupler is non-zero. The angle between the grating coupler axis and the plane of incidence of the optical signal reflected to the angled grating coupler may be 45 degrees. The angled grating coupler may comprise grates with tangential planes at the grating coupler axis that are not perpendicular to the grating coupler axis.

The angle between the grating coupler axis and the plane of incidence of the optical signal reflected to the angled grating coupler may be configured by the rotator. The die may comprise a silicon die. The rotator may comprise a non-reciprocal rotator. The angled grating coupler may comprise an overlay of two different angled grating couplers that couple signals into the waveguide and a second waveguide on the die. The optical signal reflected to the angled grating coupler may be split into the waveguide and the second waveguide utilizing overlaid grating couplers. The rotator may comprise a reciprocal rotator. The laser may comprise a semiconductor laser.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for communication, the method comprising: in a system comprising a laser, a rotator, a mirror, and a die, the die comprising an angled grating coupler and a waveguide:
    generating a continuous wave (CW) optical signal utilizing the laser;
    rotating a polarization of the optical signal utilizing the rotator;
    coupling the optical signal to the grating coupler in the die; and
    coupling the optical signal to the waveguide utilizing the grating coupler,
    wherein an angle between a grating coupler axis that is parallel to the waveguide and a plane of incidence of the optical signal reflected to the angled grating coupler is non-zero.

2. The method according to claim 1, wherein the angle between the grating coupler axis and the plane of incidence of the optical signal reflected to the angled grating coupler is 45 degrees.

3. The method according to claim 1, wherein the angled grating coupler comprises grates with tangential planes at the grating coupler axis that are not perpendicular to the grating coupler axis.

4. The method according to claim 1, wherein the angle between the grating coupler axis and the plane of incidence of the optical signal reflected to the angled grating coupler is configured by the rotator.

5. The method according to claim 1, wherein the rotator comprises a non-reciprocal rotator or a reciprocal rotator.

6. The method according to claim 1, wherein the angled grating coupler comprises an overlay of two different angled grating couplers that couple signals into the waveguide and a second waveguide on the die.

7. The method according to claim 6, comprising splitting the optical signal reflected to the angled grating coupler into the waveguide and the second waveguide utilizing overlaid grating couplers.

8. The method according to claim 1, wherein the rotator is formed at a bottom surface of a laser source assembly in which the laser and mirror reside.

9. The method according to claim 1, wherein the rotator is within a laser source assembly in which the laser and mirror reside.

10. The method according to claim 1, comprising coupling the optical signal to the grating coupler in the die utilizing a mirror element in a lid of a laser source assembly in which the laser and mirror reside.

11. A system for communication, the system comprising: a laser, a rotator, a mirror, and a die, the die comprising an angled grating coupler and a waveguide, the system being operable to:
    generate a continuous wave (CW) optical signal utilizing the laser;
    rotate a polarization of the optical signal utilizing the rotator;
    couple the optical signal to the grating coupler on the die; and
    couple the optical signal to the waveguide,
    wherein an angle between a grating coupler axis that is parallel to the waveguide and a plane of incidence of the optical signal reflected to the angled grating coupler is non-zero.

12. The system according to claim 11, wherein the angle between the grating coupler axis and the plane of incidence of the optical signal reflected to the angled grating coupler is 45 degrees.

13. The system according to claim 11, wherein the angled grating coupler comprises grates with tangential planes at the grating coupler axis that are not perpendicular to the grating coupler axis.

14. The system according to claim 11, wherein the angle between the grating coupler axis and the plane of incidence of the optical signal reflected to the angled grating coupler is configured by the rotator.

15. The system according to claim 11, wherein the rotator comprises a non-reciprocal rotator or a reciprocal rotator.

16. The system according to claim 11, wherein the angled grating coupler comprises an overlay of two different angled grating couplers that couple signals into the waveguide and a second waveguide on the die.

17. The system according to claim 16, wherein the system is operable to split the optical signal reflected to the angled grating coupler into the waveguide and the second waveguide utilizing the overlaid two different grating couplers.

18. The system according to claim 16, wherein the system is operable to couple the optical signal to the grating coupler in the die utilizing a mirror element in a lid of a laser source assembly in which the laser and mirror reside.

19. A semiconductor device comprising:
a laser, a rotator, a mirror, and a die, the die comprising a grating coupler which comprises:
 an array of grates etched into a substrate; and
 a waveguide formed on said substrate, wherein a grating coupler axis of said grating coupler is parallel to said waveguide and said grates have tangential planes at said grating coupler axis that are not perpendicular to said grating coupler axis, and
wherein said semiconductor device is operable to:
 generate an a continuous wave (CW) optical signal utilizing the laser;
 rotate a polarization of the optical signal utilizing the rotator;
 couple the optical signal to the grating coupler on the die; and
 couple the optical signal to the waveguide.

20. The semiconductor device according to claim 18, wherein the substrate is a silicon photonics die.

21. The semiconductor device according to claim 18, wherein the grating coupler is operable to couple optical signals whose plane of incidence is at a non-zero angle from the grating coupler axis.

* * * * *